United States Patent
Arpirez (10) Patent No.: US 7,827,480 B2
(45) Date of Patent: Nov. 2, 2010

(54) SYSTEM AND METHOD OF USING A TRANSACTIONAL UNIT COMPRISED OF TRANSACTIONAL SUBUNITS

(75) Inventor: Julio Cesar Arpirez, Alcorcón (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 1615 days.

(21) Appl. No.: 10/375,083

(22) Filed: Feb. 28, 2003

(65) Prior Publication Data

US 2004/0177320 A1 Sep. 9, 2004

(51) Int. Cl.
*G06F 17/00* (2006.01)
(52) U.S. Cl. ................... 715/234; 715/255; 715/256
(58) Field of Classification Search ............... 715/513, 715/530, 529, 531
See application file for complete search history.

(56) References Cited

U.S. PATENT DOCUMENTS

| | | | | |
|---|---|---|---|---|
| 6,775,680 B2* | 8/2004 | Ehrman et al. | ............... | 707/102 |
| 6,904,598 B2* | 6/2005 | Abileah et al. | ............... | 719/319 |
| 6,910,216 B2* | 6/2005 | Abileah et al. | ............... | 719/319 |
| 6,912,719 B2* | 6/2005 | Elderon et al. | ............... | 719/319 |
| 6,915,523 B2* | 7/2005 | Dong et al. | ................. | 719/319 |
| 6,920,608 B1* | 7/2005 | Davis | ......................... | 715/503 |
| 6,941,510 B1* | 9/2005 | Ozzie et al. | ................. | 715/513 |
| 6,948,174 B2* | 9/2005 | Chiang et al. | ............... | 719/319 |
| 2002/0038335 A1* | 3/2002 | Dong et al. | ................. | 709/203 |
| 2002/0038336 A1* | 3/2002 | Abileah et al. | ............... | 709/203 |
| 2002/0042849 A1* | 4/2002 | Ho et al. | ...................... | 709/329 |
| 2002/0046294 A1* | 4/2002 | Brodsky et al. | ............. | 709/246 |
| 2002/0056012 A1* | 5/2002 | Abileah et al. | ............... | 709/310 |
| 2002/0078010 A1* | 6/2002 | Ehrman et al. | ................. | 707/1 |
| 2003/0163585 A1* | 8/2003 | Elderon et al. | ............. | 709/246 |
| 2004/0111464 A1* | 6/2004 | Ho et al. | ...................... | 709/203 |
| 2004/0221292 A1* | 11/2004 | Chiang et al. | ............... | 719/310 |

OTHER PUBLICATIONS

Sundaresan, Neel; Moussa, Reshad; Algorithms and programming models for efficient representation of XML for Internet applications; Apr. 2001; ACM Press; Proceedings of the 10th international conference on World Wide Web; pp. 366-375.*

* cited by examiner

*Primary Examiner*—Doug Hutton
*Assistant Examiner*—Nathan Hillery (57) ABSTRACT

An exemplary method comprises receiving an identifier of a transactional unit along with parameters for the transactional unit. The transactional unit includes transactional subunits. The method includes determining the transactional subunits for the transactional unit using a markup language file for the transactional unit. The markup language file can include subunit tags which identify the transactional subunits. Parameters for the transactional unit are associated with a transactional subunit.

22 Claims, 6 Drawing Sheets

SYSTEM AND METHOD OF USING A TRANSACTIONAL UNIT COMPRISED OF TRANSACTIONAL SUBUNITS

RELATED APPLICATIONS

The patent applications "Method For Managing Plurality of Target Computers Using A Management Computer", by Julio Cesar Arpirez Vega; Miguel Murillo Condon, U.S. Ser. No. 10/375,176, and "Method And System Of Processing An Encapsulated File At A Management Computer", by Julio Cesar Arpirez Vega, U.S. Ser. No. 10/375,198, which are filed concurrently with the present application are incorporated herein by reference.

BACKGROUND

Computer networks can be configured with one or more servers that interface with any number of user computers such as clients. A given server can be responsible for maintaining, or configuring a particular element, or target device. For example, the server may perform tasks such as configuration changes on the target device. Configuration changes can be involved at the time the target device is added to the network, and can involve invoking scripts resident at the target device to account for environmental variables particular to the target device. As such, device specific scripts are written for each machine.

In executing software, such as configuration software, if the software fails during execution, it is desirable to have the system return to its pre-execution state. Software is therefore available which can be rolled back in the case of failure. This can be used to prevent the system from entering a partially executed state that can result in errors.

In transaction-based systems, transactions are constructed from multiple operations, and a text file can be used to define the transaction. An exemplary system which uses a text file to define the transactional unit is the first release of Hewlett Packard's software product, HP Open View Service Activator. Each transaction can be rolled back upon a failure. The transaction can be undone upon a failure of an operation by undoing each completed operation. Each undo operation is tailored to the particular target device or devices affected.

SUMMARY

Exemplary methods are disclosed for processing a transactional unit comprised of transactional subunits. An exemplary method comprises receiving an identifier of a transactional unit along with parameters for the transactional unit. The transactional unit is comprised of transactional subunits. The method comprises determining the transactional subunits for the transactional unit using a markup language file for the transactional unit. The markup language file can include subunit tags which identify the transactional subunits. Parameters for the transactional unit are associated with a transactional subunit.

Exemplary methods create a transactional unit comprised of transactional subunits. An exemplary method comprises determining transactional subunits for the transactional unit. The method comprises creating a markup language file for the transactional unit, the markup language file using predefined subunit tags to identify the transactional subunits, and defining which parameters for the transactional unit are assigned to a transactional subunit.

Exemplary embodiments are directed to a markup language file on a computer readable medium. The markup language file comprises a parameter signature for identifying parameters of a transactional unit defined by the markup language file. The markup language file also comprises predefined subunit tags for identifying transactional subunits. The markup language file defines which parameters of the parameter signature are assigned to a transactional subunit.

Exemplary embodiments are also directed to a system for processing a transactional unit comprised of transactional subunits. The system comprises means for receiving an identifier of a transactional unit along with parameters for the transactional unit. The transactional unit is comprised of transactional subunits. The system includes means for determining the transactional subunits for the transactional unit using a markup language file for the transactional unit. The markup language file includes predefined subunit tags which identify the transactional subunits. The system includes means for associating parameters for the transactional unit with at least one transactional subunit.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE PREFERRED EMBODIMENT

Figure 1A:
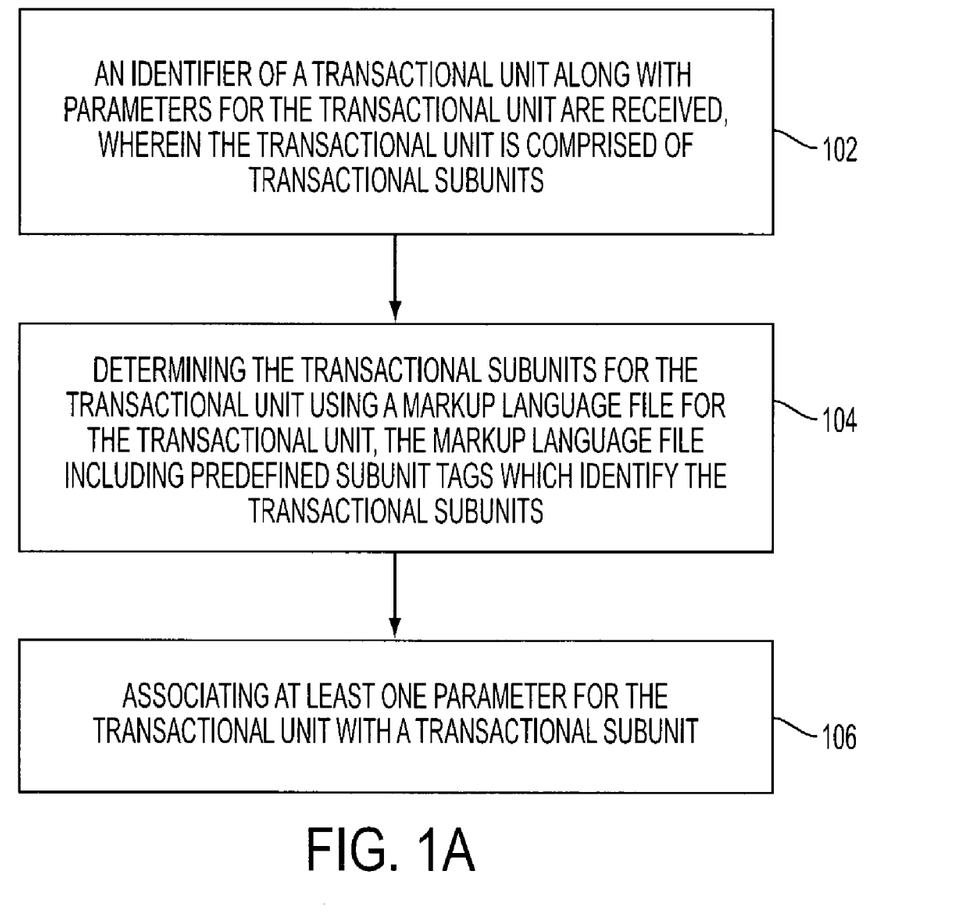
FIGS. 1A and 1B are flow charts that illustrate exemplary methods.

FIG. 1A is a flowchart of an exemplary method for processing a transactional unit comprised of transactional subunits. The method can be implemented using a computer. A computer-readable medium can contain a program which executes the method for processing a transactional unit comprised of transactional subunits.

In step 102, an identifier of a transactional unit along with parameters for the transactional unit are received. The transactional unit is comprised of transactional subunits.

The transactional subunits can be software elements configured to do one or more functions. The software can be an executable file, a script or any other sequence of operations. The transactional unit can be a grouping of the computer programs. In one example, the transactional unit is a compound task and the transactional subunit is an atomic task.

Figure 2:
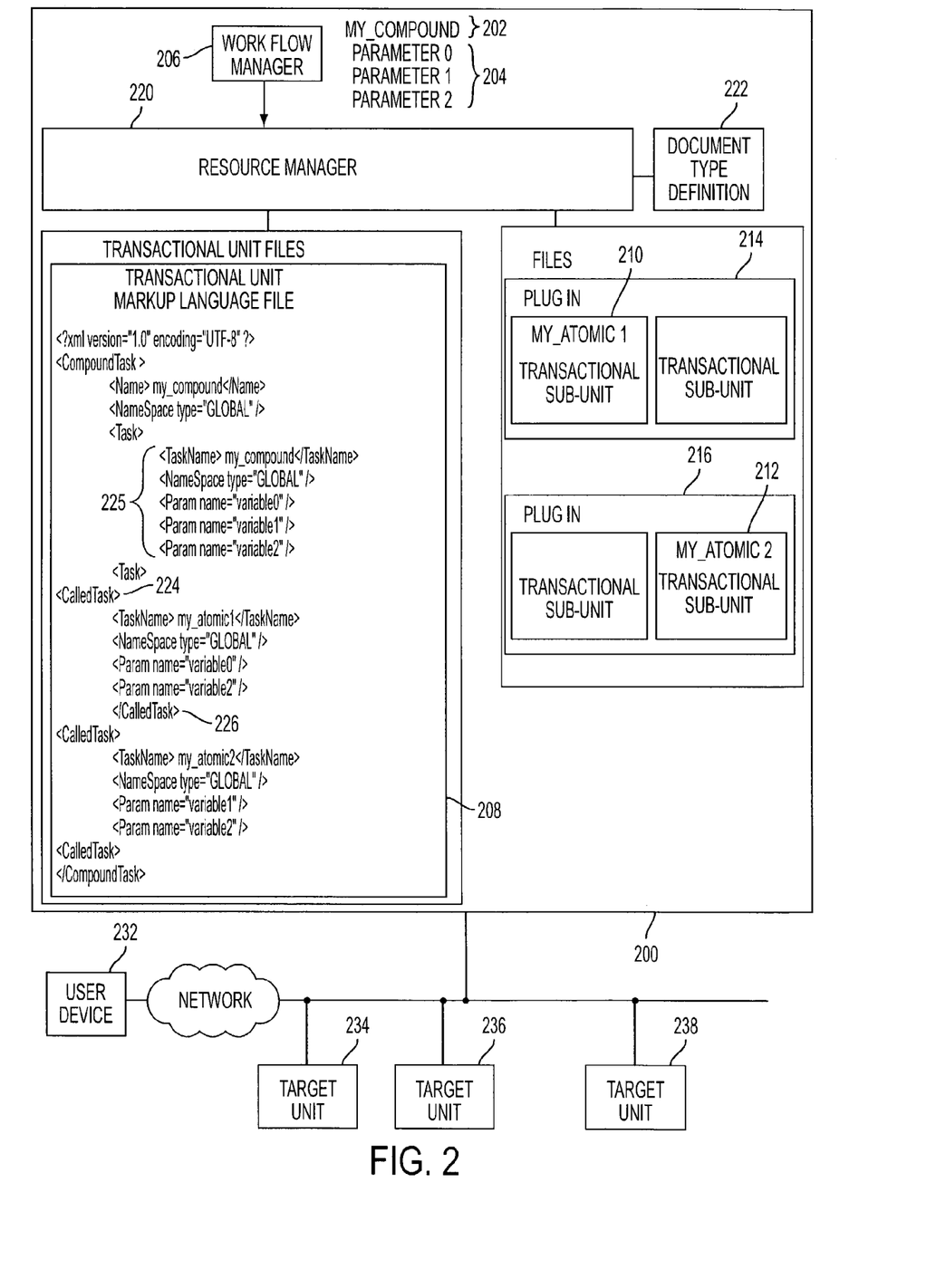
FIG. 2 is a functional block diagram of a system configured according to an exemplary embodiment, and illustrates a markup language file for a transactional unit.

The identifier of the transactional unit can be the transactional unit name as defined by a markup language file. The parameters can be values which can be passed to a transactional subunit as indicated by the markup language file. FIG. 2 shows an example of a transactional unit identifier 202 and parameters 204.

In step 104 of FIG. 1A, the transactional subunits for the transactional unit are determined using a markup language file for the transactional unit. The markup language file includes predefined subunit tags which identify the transactional subunits.

FIG. 2 illustrates an example of a transactional unit markup language file 208. In this example, the transactional unit markup language file 208 lists the transactional subunits, "my_atomic1" and "my_atomic2". In this example, the predetermined subunit tags include the tag <CalledTask> 224.

In step 106 of FIG. 1A, at least one parameter for the transactional unit is associated with a transactional subunit. In FIG. 2, the transactional unit markup language file 208 is used to determine that parameter0 and parameter2 should be passed to the transactional subunit "my_atomic1" and parameter1 and parameter2 should be passed to the transactional subunit "my_atomic2".

In one example, the transactional subunits are configured such that a completed transactional subunit can be undone. In the example of FIG. 2, transactional subunits are software written such that the operations of the software can be undone. Records of the original values modified by the transactional subunit can be maintained so that the effects of a completed transactional subunit can be reversed.

In one example, the transactional subunits to be executed are determined from the markup language file. Upon a failure, any completed transactional subunit can be undone. For example, the transactional subunits can be executed one at a time and an indication stored of which transactional subunits have been completed. If any of the transactional subunits fail, the completed transactional subunits are undone. The transactional subunits can be called with a "do" indication in normal operation and called with an "undo" indication to undo the operation.

The markup language file can be an extensible markup language (XML) file. The use of an XML file allows for dynamic changes to the transactional unit without compilation. XML is widely used and understood, and can be used to develop any desired transactional unit.

The following is one example of XML code for the markup language file 208 of FIG. 2:

```
<?xml version="1.0" encoding="UTF-8" ?>
<CompoundTask>
    <Name> my_compound</Name>
    <NameSpace type="GLOBAL" />
    <Task>
        <TaskName> my_compound </TaskName>
        <NameSpace type="GLOBAL" />
        <Param name="variable0" />
        <Param name="variable1" />
        <Param name="variable2" />
    </Task>
    <CalledTask>
        <TaskName>my_atomic1</TaskName>
        <NameSpace type="GLOBAL" />
        <Param name="variable0" />
        <Param name="variable2" />
    </CalledTask>
    <CalledTask>
        <TaskName>my_atomic2</TaskName>
        <NameSpace type="GLOBAL" />
        <Param name="variable1" />
        <Param name="variable2" />
    </CalledTask>
</CompoundTask>
```

In an exemplary embodiment, a Document Type Definition (DTD), such as the document type definition 222 of FIG. 2, can be used for defining the subunit tags. Document Type Definitions are used for XML files and allow the XML files to be correctly parsed for an application.

In FIG. 2, the document type definition 222 includes a definition of the transactional unit of the element name "CALLED TASK" to define the transactional subunit. One example of a document type definition for use with the exemplary FIG. 2 XML file format is shown below:

```
<!-- DTD for transactional unit definitions. -->
<!ELEMENT CompoundTask (Name, Description?, NameSpace?,
Task,CalledTask+) >
<!ELEMENT Name          (#PCDATA) >
<!ELEMENT Description   (#PCDATA) >
<!ELEMENT NameSpace     (#PCDATA) >
<!ATTLIST NameSpace type CDATA #REQUIRED >
<!-- Transactional unit -->
<!ELEMENT Task (TaskName, NameSpace?, Param+) >
<!ELEMENT TaskName      (#PCDATA) >
<!--Called Tasks -->
<!ELEMENT CalledTask (TaskName, NameSpace?, Param+) >
<!-- Parameters passed to called tasks -->
<!ELEMENT Param         (#PCDATA) >
<!ATTLIST Param name CDATA #REQUIRED >
```

In this example, predetermined elements CompoundTask, CalledTask and other fields are defined.

In the FIG. 2 example, predefined subunit tags bound (e.g., surround) and identify each transactional subunit in the markup language file. For example, the predetermined subunit tags "<CalledTask>" bound and identify "my_atomic1" which is a transactional subunit.

A parameter signature of the markup language file, such as parameter signature 225 of FIG. 2, can be used for identifying parameters of the transactional unit. The parameter signature can be used to, for example, determine which parameters to be assigned (e.g., to be passed) to each transactional subunit. In the FIG. 2, the markup language file 208 indicates that the parameters with the parameter names "variable0" and "variable2" are provided to the transactional subunit "my_atomic1".

A Document Type Definition (DTD) can be used to define the predefined subunit tags. In the example of FIG. 2, the DTD 222 is used. A parameter signature of the markup language file can used to identify parameters of the transactional unit. In the example of FIG. 2, the parameter signature 225 in the transactional unit markup language file 208 is used.

In one example, the markup language file is used to determine which parameters for the transactional unit are assigned to a transactional subunit. In the FIG. 2 example "parameter0" is given the parameter name "variable0", "Parameter1" is given the parameter name "variable1", and "parameter2" is given the parameter name "variable2". "Variable0" and "variable1", corresponding to "parameter0" and "parameter1", are provided to transactional subunit 210. "Variable1" and "variable2", corresponding to "parameter1 " and "parameter2", are provided to transactional subunit 212.

Device 200 can be any computer or computers suitable for performing the functions described herein. Device 200 of FIG. 2 system can, for example, be an activation server used to configure a target device, such as target unit 234, 236 or 238, of a computer network. Device 200 can be used to implement a method for processing a transactional unit comprised of transactional subunits. Device 200 includes a workflow manager 206 and a resource manager 220 each of which can be configured as software components resident on one or more computers. The system of FIG. 2 also includes memory for storing transactional unit files 208, files 214 and a document type definition 222.

The workflow manager 206 can be software or hardware which receives a user input to determine a transactional unit to execute for a configuration or other function. Transactional unit identifiers and parameters can be produced based on the user input. In one example, a graphical interface can be used to obtain the user input.

In the example of FIG. 2, the resource manager 220 receives the transactional unit identifiers and parameters from the workflow manager 206. The resource manager 220 uses the transactional unit markup language file 208 identified by the identifier 102 to determine the transaction subunits 110 and 112 to execute. The resource manager 220 also uses the transactional unit markup language file 208 to assign the parameters to the correct transactional subunit. The resource manager can execute the transactional subunits and in the case of a failure of a transactional subunit, undo any completed transactional subunit.

A user device 232 can make requests to the unit 200. The resource manager 220 within the activation server 300 can produce a transactional unit indication along with parameters. The parameters can include available resources and data provided by the user device.

In one example, a name input by the user can be passed as a parameter by the workflow manager to the resource manager 220. The resource manager 220 in the unit 200 obtains the markup language file for the transactional unit and then obtains the different transactional subunits. The correct parameters are assigned to the different transactional subunits. If there is a failure, the system is returned to its previous state by undoing the transactional subunits.

In one example, the device 200 is an activation server associated with a number of different target units, such as target units 234, 236 and 238. The transactional subunit can implement operations, such as configuration operations, on the different target units.

Another example of a transactional unit markup language (e.g., XML) file is as follows:

```
<?xml version="1.0" encoding="UTF-8" ?>
<CompoundTask>
    <Name>SWH_addBaseAndFTP</Name>
    <Description>description here</Description>
    <NameSpace type="GLOBAL" />
    <Task>
        <TaskName>SWH_addBaseAndFTP</TaskName>
        <NameSpace type="GLOBAL" />
        <Param name="permissions" />
        <Param name="tarfile" />
        <Param name="virtualSiteName" />
        <Param name="apacheServer" />
        <Param name="custLogin" />
        <Param name="custPasswd" />
        <Param name="custUID" />
        <Param name="custHomeDir" />
        <Param name="custGroup" />
        <Param name="apacheServerIP" />
        <Param name="apacheServerPort" />
        <Param name="dnsServer" />
        <Param name="webDnsEntityType" />
        <Param name="webDnsHostList" />
        <Param name="webDnsZoneResponsibility" />
        <Param name="dnsRefreshTm" />
        <Param name="dnsRetryTm" />
        <Param name="dnsExpireTm" />
        <Param name="dnsMinTm" />
```

-continued

```
        <Param name="NS" />
        <Param name="A" />
        <Param name="iumServer" />
        <Param name="ftpAliasIpAddress" />
        <Param name="ftpAliasIpInterfaceName" />
        <Param name="ftpAliasIpSubnetMask" />
        <Param name="ftpAliasIpBroadcastAddress" />
        <Param name="ftpAnonymousUpload" />
        <Param name="ftpUploadOwner" />
        <Param name="ftpUploadGroup" />
        <Param name="virtualFTPName" />
        <Param name="ftpDnsEntType" />
        <Param name="ftpDnsHostList" />
        <Param name="dnsFtpZoneResponsibility" />
        <Param name="webDnsAtSymbol" />
        <Param name="ftpDnsAtSymbol" />
    </Task>
    <CalledTask>
        <TaskName>UXOS_addUser</TaskName>
        <NameSpace type="GLOBAL" />
        <Param name="apacheServer" />
        <Param name="custLogin" />
        <Param name="custPasswd" />
        <Param name="custUID" />
        <Param name="custHomeDir" />
        <Param name="custGroup" />
    </CalledTask>
    <CalledTask>
        <TaskName>UXOS_addDir</TaskName>
        <NameSpace type="GLOBAL" />
        <Param name="apacheServer" />
        <Param name="custHomeDir" />
        <Param name="custLogin" />
        <Param name="custGroup" />
        <Param name="permissions" />
        <Param name="tarfile" />
    </CalledTask>
    <CalledTask>
        <TaskName>APACHE_addWeb</TaskName>
        <NameSpace type="GLOBAL" />
        <Param name="apacheServer" />
        <Param name="apacheServerIP" />
        <Param name="apacheServerPort" />
        <Param name="virtualSiteName" />
        <Param name="custHomeDir" />
    </CalledTask>
    <CalledTask>
        <TaskName>UXDNS_addZoneEnt</TaskName>
        <NameSpace type="GLOBAL" />
        <Param name="dnsServer" />
        <Param name="virtualSiteName" />
        <Param name="webDnsEntityType" />
        <Param name="webDnsHostList" />
    </CalledTask>
    <CalledTask>
        <TaskName>UXDNS_iniZone</TaskName>
        <NameSpace type="GLOBAL" />
        <Param name="dnsServer" />
        <Param name="virtualSiteName" />
        <Param name="apacheServer" />
        <Param name="webDnsZoneResponsibility" />
        <Param name="dnsRefreshTm" />
        <Param name="dnsRetryTm" />
        <Param name="dnsExpireTm" />
        <Param name="dnsMinTm" />
    </CalledTask>
    <CalledTask>
        <TaskName>UXDNS_addResRec</TaskName>
        <NameSpace type="GLOBAL" />
        <Param name="dnsServer" />
        <Param name="virtualSiteName" />
        <Param name="webDnsAtSymbol" />
        <Param name="NS" />
        <Param name="dnsServer" />
    </CalledTask>
    <CalledTask>
        <TaskName>UXDNS_addResRec</TaskName>
        <NameSpace type="GLOBAL" />
        <Param name="dnsServer" />
```

-continued

```xml
        <Param name="virtualSiteName" />
        <Param name="webDnsAtSymbol" />
        <Param name="A" />
        <Param name="apacheServerIP" />
    </CalledTask>
    <CalledTask>
        <TaskName>UXDNS_reloadDNS</TaskName>
        <NameSpace type="GLOBAL" />
        <Param name="dnsServer" />
    </CalledTask>
    <CalledTask>
        <TaskName>IUM_addCustomer</TaskName>
        <NameSpace type="GLOBAL" />
        <Param name="iumServer" />
        <Param name="virtualSiteName" />
        <Param name="custLogin" />
    </CalledTask>
    <CalledTask>
        <TaskName>UXOS_addAliasIP</TaskName>
        <NameSpace type="GLOBAL" />
        <Param name="apacheServer" />
        <Param name="ftpAliasIpAddress" />
        <Param name="ftpAliasIpInterfaceName" />
        <Param name="ftpAliasIpSubnetMask" />
        <Param name="ftpAliasIpBroadcastAddress" />
    </CalledTask>
    <CalledTask>
        <TaskName>UXOS_enFTPUser</TaskName>
        <NameSpace type="GLOBAL" />
        <Param name="apacheServer" />
        <Param name="custLogin" />
    </CalledTask>
    <CalledTask>
        <TaskName>UXFTP_addFTP</TaskName>
        <NameSpace type="GLOBAL" />
        <Param name="apacheServer" />
        <Param name="ftpAliasIpAddress" />
        <Param name="custHomeDir" />
        <Param name="custGroup" />
    </CalledTask>
    <CalledTask>
        <TaskName>UXFTP_enableAnonFTP</TaskName>
        <NameSpace type="GLOBAL" />
        <Param name="apacheServer" />
        <Param name="ftpAliasIpAddress" />
        <Param name="ftpAnonymousUpload" />
        <Param name="ftpUploadOwner" />
        <Param name="ftpUploadGroup" />
    </CalledTask>
    <CalledTask>
        <TaskName>UXDNS_addZoneEnt</TaskName>
        <NameSpace type="GLOBAL" />
        <Param name="dnsServer" />
        <Param name="virtualFTPName" />
        <Param name="ftpDnsEntType" />
        <Param name="ftpDnsHostList" />
    </CalledTask>
    <CalledTask>
        <TaskName>UXDNS_iniZone</TaskName>
        <NameSpace type="GLOBAL" />
        <Param name="dnsServer" />
        <Param name="virtualFTPName" />
        <Param name="apacheServer" />
        <Param name="dnsFtpZoneResponsibility" />
        <Param name="dnsRefreshTm" />
        <Param name="dnsRetryTm" />
        <Param name="dnsExpireTm" />
        <Param name="dnsMinTm" />
    </CalledTask>
    <CalledTask>
        <TaskName>UXDNS_addResRec</TaskName>
        <NameSpace type="GLOBAL" />
        <Param name="dnsServer" />
        <Param name="virtualFTPName" />
        <Param name="ftpDnsAtSymbol" />
        <Param name="NS" />
        <Param name="dnsServer" />
    </CalledTask>
    <CalledTask>
```

-continued

```xml
        <TaskName>UXDNS_addResRec</TaskName>
        <NameSpace type="GLOBAL" />
        <Param name="dnsServer" />
        <Param name="virtualFTPName" />
        <Param name="ftpDnsAtSymbol" />
        <Param name="A" />
        <Param name="ftpAliasIpAddress" />
    </CalledTask>
    <CalledTask>
        <TaskName>UXDNS_reloadDNS</TaskName>
        <NameSpace type="GLOBAL" />
        <Param name="dnsServer" />
    </CalledTask>
</CompoundTask>
```

In this example, the transactional unit configuration includes a relatively large number of transactional subunits. The first part of each transactional subunit name indicates a plug-in that contains the transactional subunit. This example also shows examples of parameters to be passed to the transactional subunits.

Figure 3:
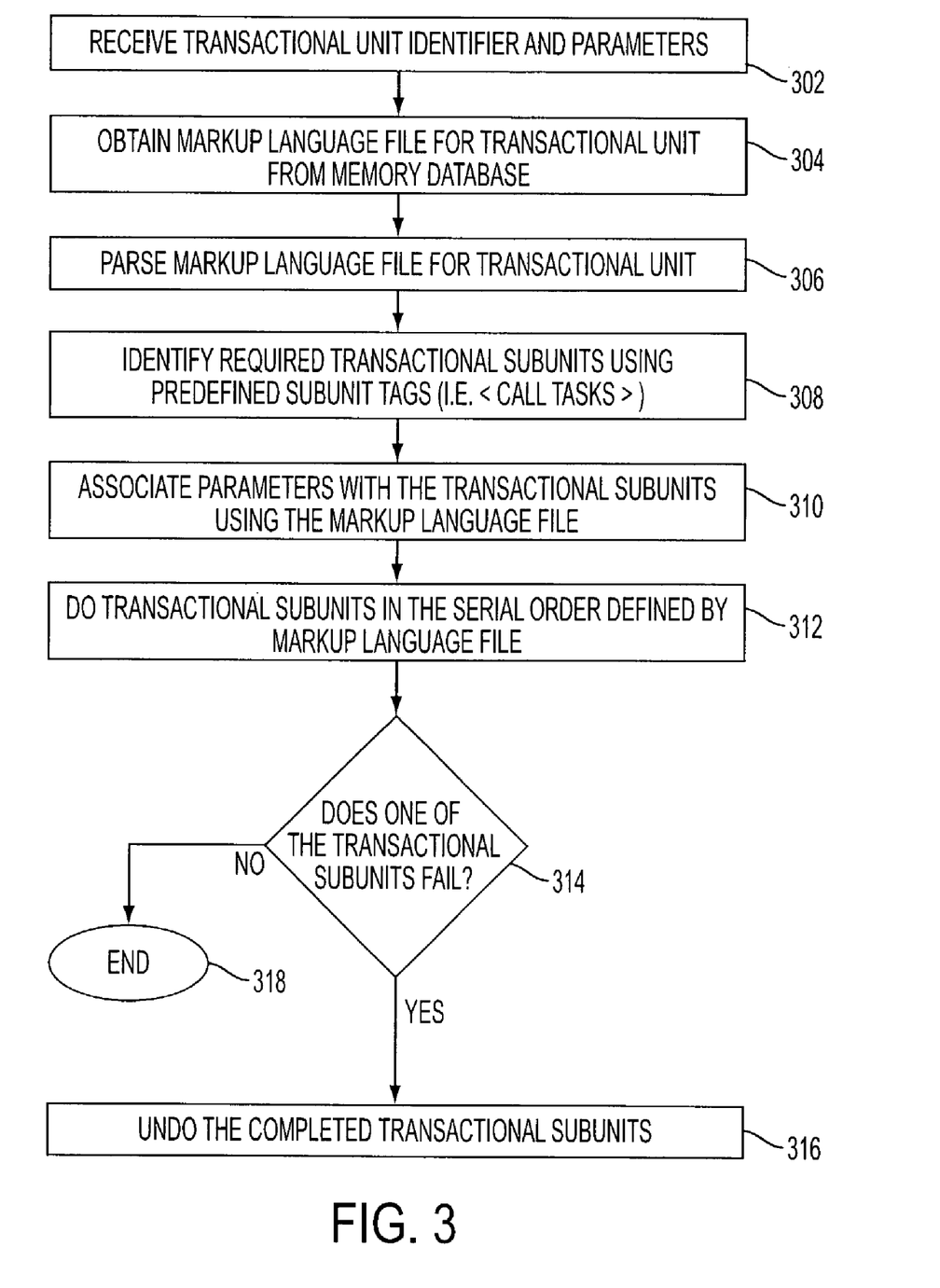
FIG. 3 is a flowchart illustrating a method of one embodiment.

FIG. 3 shows an exemplary method whereby in step 302, the transactional identifiers and parameters are received. In step 304, the markup language file for the transactional unit is obtained from a database. In step 306, the markup language file is parsed. The markup language file can be parsed using a document type definition. In step 308, transactional subunits are identified using predetermined subunit tags such as the <CalledTask> tags. In step 310, parameters are associated with the transactional subunits using the markup language file. In step 312, the transactional subunits are done in, for example, the serial order defined by the markup language file. In step 314, if a failure in the execution of a transactional subunit occurs, the completed subunit is undone in step 316. Otherwise transactional unit finishes in step 318.

Figure 1B:
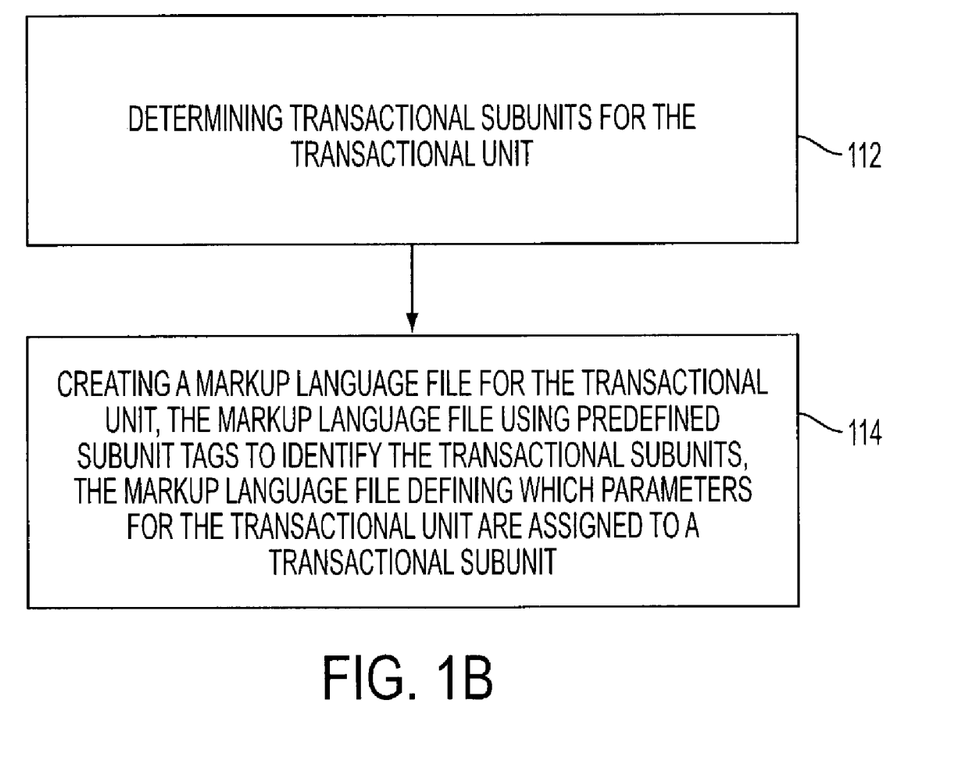

FIG. 1B is a flow chart that illustrates an exemplary method for creating a transactional unit comprised of transactional subunits. The method can be implemented using a computer. A computer-readable medium can contain a program which executes the method for creating a transactional unit comprised of transactional subunits.

In step 112, transactional subunits, such as transactional subunits 210 and 212 of FIG. 2, are determined for a transactional unit. In step 114 of FIG. 1B, a markup language file, such as markup language file 208 of FIG. 2, is created for the transactional unit. The markup language uses predefined subunit tags, such as predefined subunit tags 224 and 226, to identify the transactional subunits. The markup language file defines which parameters for the transactional unit are assigned to a transactional subunit.

Figure 4:
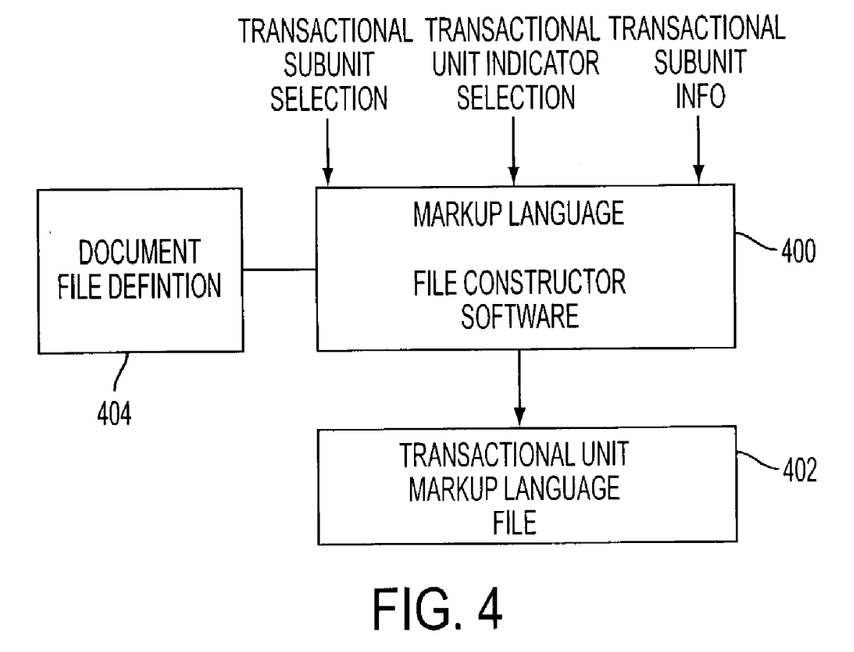
FIG. 4 is a diagram that illustrates an example of software used to produce a markup language file for a transactional unit.

Software can be used to construct (e.g., assemble) the markup language file. FIG. 4 illustrates an example of markup language file construction software 400 which, in response to a user or other input, can construct a markup language file for a transactional unit. In one embodiment, the software 400 can automatically add, or prompt the user to add, appropriate parameters (for example, parameters associated with a particular atomic task of a given transactional subunit), to associate with each transactional subunit. The user can select, and/or be prompted to select, a transactional unit indicator, transactional subunits and associated parameters via representative inputs to the software 400 designated "transactional subunit selection", "transactional unit indicator selection" and "transactional subunit information".

In an exemplary embodiment, the markup language file is an XML file. A document type definition, such as document type definition 404, can be used to create the transactional unit markup language file 402.

In addition, or as an alternative to, constructing the transactional unit markup language file using software, the user can construct the markup language file by hand. In an exemplary embodiment, predefined transactional subunit tags bound (e.g., denote the start and end) and identify each transactional subunit in the markup language file. The markup language file can include a parameter signature that can be used to name parameters for the transactional unit. The markup language file can include an indication of which named parameters have been passed to each identified transactional subunit.

Figure 5:
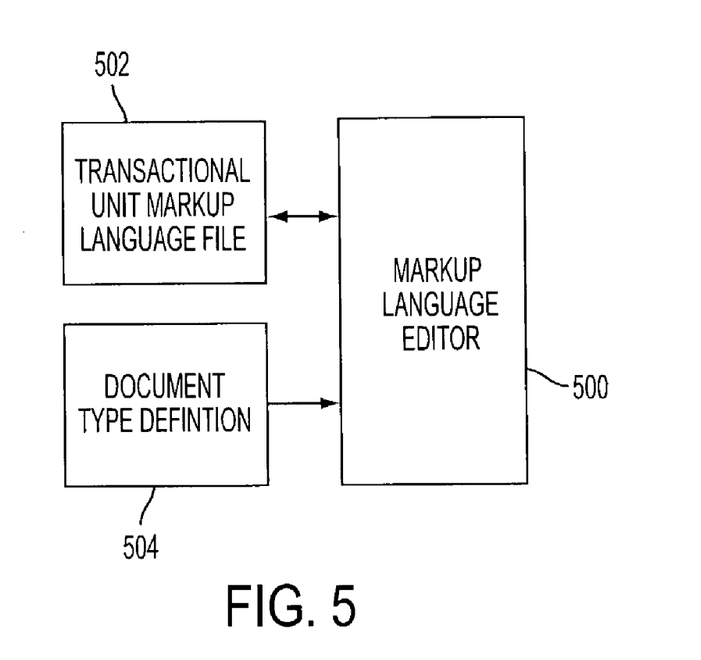
FIG. 5 is a diagram that illustrates a markup language editor used to edit a markup language file for a transactional unit.

FIG. 5 illustrates a use of an exemplary markup language editor 500 which can be used to find errors in a markup language file 502 using a Document Type Definition 504. In the operation of the markup language editor 500, as with the software 400 of FIG. 4 and the resource manager 220 of FIG. 2, the document type definition can be used to help parse the markup language files to determine if the markup language file is correctly constructed and to determine the means to identify the transactional subunits and determine the meaning of the parameters. The markup language editor 500 of FIG. 5 can be a standard XML editor for the creation and manipulation of XML which can assist in the development of new tools for creating and editing the transactional units.

An exemplary embodiment involves a markup language file on a computer readable medium. The markup language file, such as markup language file 208 of FIG. 2, can comprise a parameter signature, such as parameter signature 225 of FIG. 2, for identifying parameters of a transactional unit defined by the markup language file. The markup language file also comprises predefined subunit tags, such as predefined subunit tags 224 and 226 "<CALLED TASK>", for identifying transactional subunits. The markup language file can define which parameters of the parameter signature are assigned to a transactional subunit. The markup language file can be an XML file, and the predefined subunit tag can be defined in a Document Type Definition (DTD) for the XML file.

Figure 6:
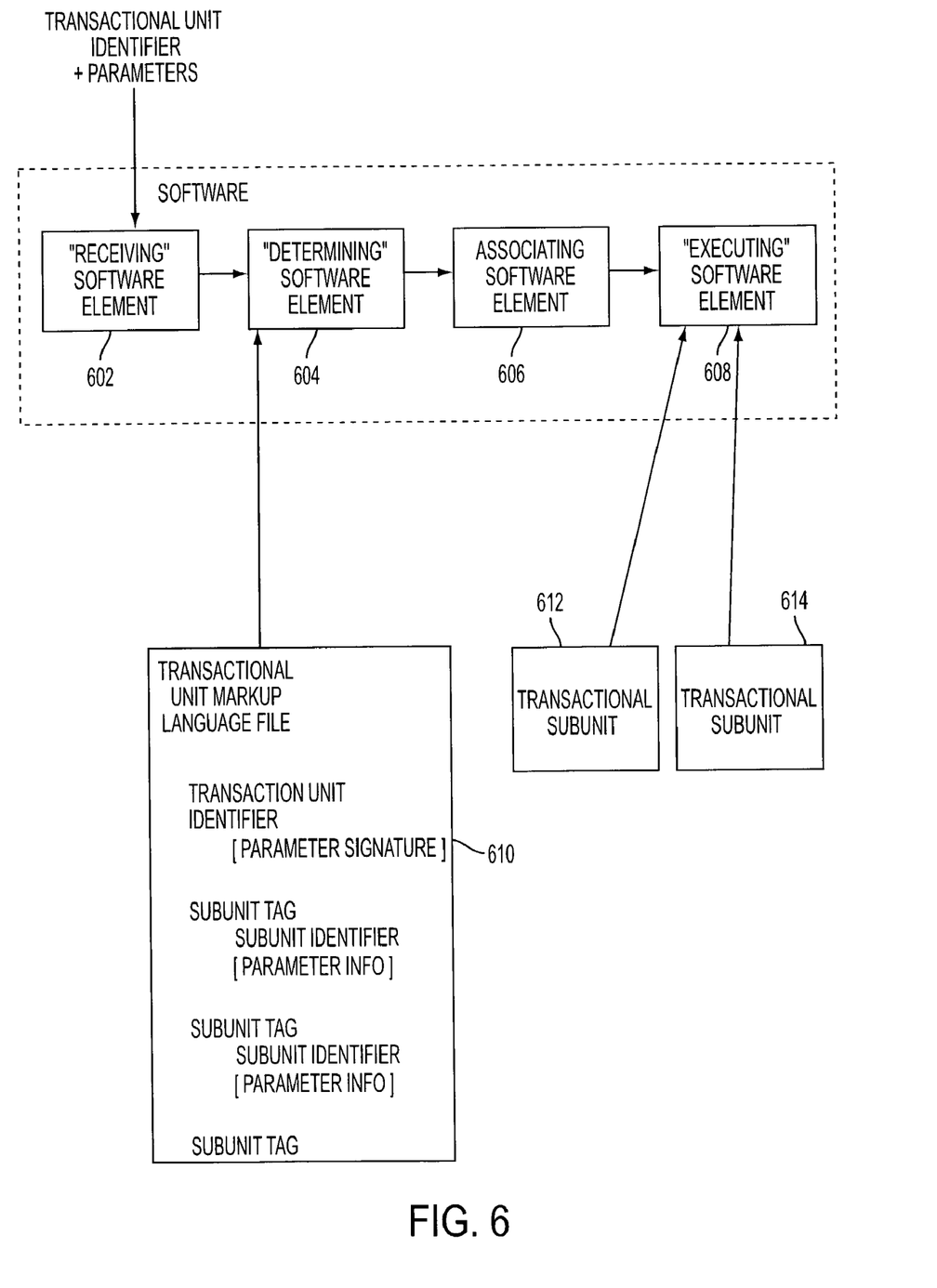
FIG. 6 is a diagram illustrating an exemplary system for processing a transactional unit according to an exemplary embodiment.

FIG. 6 illustrates an exemplary embodiment of a system for processing a transactional unit comprised of transactional subunits. The system comprises means for receiving an identifier of a transactional unit along with parameters for the transactional unit, such as the "receiving" software element 602 of FIG. 6, configured for example, as a computer interface operated under control of a processor. The transactional unit can comprise transactional subunits, the transactional subunits being configured such that any completed transactional subunit can be undone.

The system also comprises means for determining the transactional subunits for the transactional unit using a markup language file 610 for the transactional unit, such as the "determining" software element 604 of FIG. 6, executable by a processor. The markup language file can include predefined subunit tags which identify the transactional subunits. The system comprises means for associating parameters for the transactional unit with at least one transactional subunit, such as the "associating" software element 606 of FIG. 6, also executable by a processor.

In an exemplary embodiment, the system comprises means for executing the transactional subunits determined from the markup language file and, upon a failure, undoing any transactional subunit that has been completed. An example of the executing means is the "executing" software element of FIG. 6 executable by a processor.

In the FIG. 6 example, the software elements 602, 604, 606 and 608 can be portions of code or script in one or multiple programs stored, for example, in a computer readable medium. The software can be run on one or more processing units, such as a server or other computer system having an appropriate memory(ies) and processor(s).

It will be appreciated by those of ordinary skill in the art that the system and method can be embodied in other specific forms without departing from the spirit or essential character thereof. The presently disclosed embodiments are therefore considered in all respects to be illustrative and not restrictive. The scope of the system and method is indicated by the appended claims rather than the foregoing description, and all changes which come within the meaning and range of equivalents thereof are intended to be embraced therein.

The invention claimed is:

1. A method for processing a transactional unit comprised of transactional subunits that are executable, the method comprising:
   receiving an identifier of a transactional unit along with parameters for the transactional unit, wherein the transactional unit is comprised of transactional subunits;
   determining the transactional subunits for the transactional unit using a markup language file for the transactional unit, the markup language file including predefined subunit tags which identify the transactional subunits
   associating at least one parameter for the transactional unit with a transactional subunit; and
   executing the transactional subunits and storing an indication of which transactional subunits have completed execution.

2. The method of claim 1, wherein the transactional subunits are configured such that a completed transactional subunit can be undone.

3. The method of claim 2, comprising:
   executing the transactional subunits one at a time and, upon a failure, undoing any transactional subunit that has completed execution.

4. The method of claim 3, wherein the executing of the transactional subunits includes calling the transactional subunits with a do indication and wherein the undoing of the transactional subunit includes calling the transactional subunits with an undo indication.

5. The method of claim 1 wherein the markup language file is an XML file.

6. The method of claim 5, wherein the determining of the transactional subunits uses a Document Type Definition (DTD) defining the predefined subunit tags.

7. The method of claim 1, wherein associating of the at least one parameter uses a parameter signature of the markup language file for identifying parameters of the transactional unit.

8. The method of claim 7, wherein the associating of the at least one parameter uses the markup language file to determine which parameters for the transactional unit are assigned to a transactional subunit.

9. The method of claim 1, wherein the transactional subunits are any of an executable file, a script, and a sequence of operations.

10. A system for processing a transactional unit comprised of transactional subunits, the system comprising:
   means for receiving an identifier of a transactional unit along with parameters for the transactional unit, wherein the transactional unit is comprised of transactional subunits that are executable;
   means for determining the transactional subunits for the transactional unit using a markup language file for the transactional unit, the markup language file including predefined subunit tags which identify the transactional subunits means for associating parameters for the transactional unit with at least one transactional subunit; and means for executing the transactional subunits and storing an indication of which transactional subunits have completed execution.

11. The system of claim 10, wherein the transactional subunits are configured such that a completed transactional subunit can be undone.

12. The system of claim 10, comprising:

means for executing the transactional subunits one at a time and, upon a failure, undoing any transactional subunit that has completed execution.

13. The method of claim 10, wherein the transactional subunits are any of an executable file, a script, and a sequence of operations.

14. A computer-readable medium containing a program for processing a transactional unit comprised of transactional subunits that are executable, comprising:

receiving an identifier of a transactional unit along with parameters for the transactional unit, wherein the transactional unit is comprised of transactional subunits;

determining the transactional subunits for the transactional unit using a markup language file for the transactional unit, the markup language file including predefined subunit tags which identify the transactional subunits associating at least one parameter for the transactional unit with a transactional subunit; and executing the transactional subunits and storing an indication of which transactional subunits have completed execution.

15. The computer-readable medium containing a program of claim 14, wherein the transactional subunits are configured such that a completed transactional subunit can be undone.

16. The computer-readable medium containing a program of claim 15, comprising:

executing the transactional subunits one at a time, and upon a failure, undoing any transactional subunit that has completed execution.

17. The computer-readable medium containing a program of claim 16, wherein the executing of the transactional subunits includes calling the transactional subunits with a do indication and wherein the undoing of the transactional subunit includes calling the transactional subunits with an undo indication.

18. The computer-readable medium containing a program of claim 14 wherein the markup language file is an XML file.

19. The computer-readable medium containing a program of claim 18, wherein the determining of the transactional subunits uses a Document Type Definition (DTD) defining the predefined subunit tags.

20. The computer-readable medium containing a program of claim 14, wherein associating of the at least one parameter uses a parameter signature of the markup language file for identifying parameters of the transactional unit.

21. The computer-readable medium containing a program of claim 20, wherein the associating of the at least one parameter uses the markup language file to determine which parameters for the transactional unit are assigned to a transactional subunit.

22. The method of claim 14, wherein the transactional subunits are any of an executable file, a script, and a sequence of operations.

* * * * *